US009423070B2

(12) United States Patent
Pyke

(10) Patent No.: US 9,423,070 B2
(45) Date of Patent: Aug. 23, 2016

(54) GUTTER-ANCHORED STRUCTURE FOR PORTABLE FIRE SPRINKLERS

(71) Applicant: Darrell Pyke, Peachland (CA)

(72) Inventor: Darrell Pyke, Peachland (CA)

(73) Assignee: WASP MANUFACTURING LTD., Kelowna, B.C. (CA)

( * ) Notice: Subject to any disclaimer, the term of this patent is extended or adjusted under 35 U.S.C. 154(b) by 0 days.

(21) Appl. No.: 13/999,992

(22) Filed: Apr. 14, 2014

(65) Prior Publication Data

US 2015/0292671 A1 Oct. 15, 2015

(51) Int. Cl.
*A62C 13/76* (2006.01)
*F16M 13/02* (2006.01)

(52) U.S. Cl.
CPC .................................... *F16M 13/02* (2013.01)

(58) Field of Classification Search
CPC .......... B66F 13/00; A47G 1/162; A47G 1/22; F16M 13/02
USPC ......... 248/346.01, 346.03, 346.06, 352, 48.1, 248/75, 77, 78, 229.16, 79; 254/1, DIG. 1; 280/763.1; 138/105, 106
See application file for complete search history.

(56) References Cited

U.S. PATENT DOCUMENTS 2,592,053 A * 4/1952 Megla ............................ 248/79
D264,010 S * 4/1982 Graf ............................ D29/129
4,603,501 A * 8/1986 Radcliff ......................... 43/21.2
6,035,940 A * 3/2000 Bourke .......................... 169/47
6,230,367 B1 * 5/2001 Riedl ............................ 16/436
6,502,796 B1 * 1/2003 Wales ........................ 248/316.1
6,732,951 B1 5/2004 Salazar et al.
6,745,985 B2 * 6/2004 Healy ............................ 248/75
6,929,072 B2 8/2005 Brown
7,886,837 B1 2/2011 Helfgott
8,118,109 B1 2/2012 Hacker
8,523,121 B2 * 9/2013 Shelton .......................... 248/75
8,534,370 B1 9/2013 Al Azemi
8,632,037 B1 * 1/2014 Rael .............................. 248/79
2006/0060362 A1 3/2006 Crowley
2007/0158083 A1 7/2007 Duncan
2008/0289830 A1 11/2008 Olson
2009/0090520 A1 4/2009 Lee
2009/0200044 A1 8/2009 Durkin

FOREIGN PATENT DOCUMENTS

WO WO 2013/010098 1/2013

* cited by examiner

*Primary Examiner* — Gwendolyn Baxter
(74) *Attorney, Agent, or Firm* — Frederick Kaufman

(57) ABSTRACT

A plastic body incorporating a flate base, with a top side and a bottom side, is encompassed by a rim perpendicular on it. A pair of rectangular prolongations extends from a side of flat base. Each rectangular prolongation terminates into a downwardly extending end, bent back at 90 degrees and provided with a tapered plate, inwardly directed for tangentially contacting an interior of a gutter. A cantilever bar, having a bent longitudinal axis of symmetry, is located at midway between the pair of rectangular prolongations. A slanted, ribbed plate extending transversally at the bottom end of cantilever bar is adapted to tangentially contact a gutter, respectively a curvilinear external surface of the latter. A tubular housing projecting perpendicularly out of the bottom side of the flat base is used for inserting a pole for positioning and anchoring the gutter-anchored structure.

2 Claims, 11 Drawing Sheets

Section B-B

GUTTER-ANCHORED STRUCTURE FOR PORTABLE FIRE SPRINKLERS

CROSS-REFERENCE TO RELATED APPLICATION

This application claims the benefit of priority on the basis of Canadian Patent Application No. 2,842,771 filed on Feb. 12, 2014.

I. BACKGROUND OF THE INVENTION

1. Definition of the Invention

The present invention relates, in general, to fire sprinklers and, more special, to a gutter-anchored structure for portable fire sprinklers.

2. Description of the State of the Art

From the prior art there are known systems by which building structures are protected from wildfire, adjacent of fires, and similar disasters.

A multitude of patents has addressed this issue of buildings fire protection. One can say that only sprinklers disposed on and attached to roofs were envisaged.

II. SUMMARY OF THE INVENTION

A first objective of the present invention is to develop a structure, molded as an integral unit of dimensionally stable plastic material.

A second objective of the present invention is to develop a structure simple in design, inexpensive and dependable.

A third objective of the present invention is to develop a portable structure, easy to install and service, does not require placing on and attaching to the roof and is simple to winterize by turning off the faucet and detaching water hose.

A fourth objective of the present invention is to extend its versatility by using it for cooling houses in summer months—spraying water on the roof surface; the water evaporates and cools the surface, impliedly the house. Thus, the cooling bill could be substantially reduced.

Broadly stating, in view of the foregoing objectives, the Applicant developed a gutter-anchored structure for portable fire sprinklers comprising a monolithic plastic body incorporating a flat base with a top side and a bottom side and a rim perpendicular on the flat base and surrounding the latter. A pair of rectangular prolongations extending from a side of the flat base, each rectangular prolongation terminating into a downwardly extending end, bent back at 90 degrees and provided with a tapered plate, inwardly directed for tangentially contacting an interior of a gutter. A pair of hollow, cylindrical outlets, closely spaced and forming an unitary body, is partially embedded into the flat base. One of the pair of hollow, cylindrical outlets has its longitudinal axis of symmetry angled with respect to the top side of the flat base, while another one of the pair of hollow, cylindrical outlets has its longitudinal axis of symmetry perpendicular to the flat base. The aforementioned longitudinal axes of symmetry concur and at some point intersect, so that the pair of hollow, cylindrical outlets changes into a common, hollow cylindrical inlet projecting outwardly from the bottom side of the flat base. A cantilever bar, having a bent longitudinal axis of symmetry and being located at midway between the pair of rectangular prolongations, incorporates a slanted, ribbed plate extending transversely at the bottom end of the cantilever bar and is adapted to tangentially contact the gutter, respectively a curvilinear external surface of the latter. A tubular housing, projecting perpendicularly out of the bottom side of the flat base, is intended to capture a pole end for positioning and anchoring the gutter-anchored structure to the gutter.

In one aspect of the present invention, the gutter-anchored structure for portable fire sprinklers comprises a molded monolithic body incorporating a flat base and having a top side and a bottom side. Viewed from the top, the flat base has a triangular-like shape with rounded corners. A pair of rectangular prolongations extends from a side of the flat base, this side being located oppositely to an apex of the flat base; each rectangular prolongation of the pair of rectangular prolongations is spacedly disposed at one of the opposed extremities of the side and terminates into a downwardly extending end, bent back at 90 degrees, i.e. perpendicularly directed to the flat base. The downwardly extending end incorporates a ribbed side, outwardly directed, and, oppositely, a tapered plate inwardly directed, the tapered plate being adapted to tangentially contact and secure to a gutter, respectively to a curvilinear, internal surface of the gutter. A rectangular opening is formed between the pair of rectangular prolongations. A rim perpendicular to the bottom side of the flat base extends below the latter, along its perimeter. A pair of hollow, cylindrical outlets, closely spaced and forming an unitary body, located adjacent the apex and partially embedded into the flat base. One of the pair of hollow, cylindrical outlets, contiguous to the apex, has its longitudinal axis of symmetry angled with respect to the top side of the flat base, while the other one of the pair of hollow, cylindrical outlets has its longitudinal axis of symmetry perpendicularly directed to the top side of the flat base. The aforementioned longitudinal axes of symmetry concur and at some point intersect, so that the pair of hollow, cylindrical outlets changes into a common, hollow cylindrical inlet projecting outwardly from the bottom side of the flat base and having a female threaded surface, thus being adapted to interconnect with a threaded end of a hose. The pair of hollow cylindrical outlets are both provided with an internal thread; alternatively, only in one of the pair of hollow cylindrical outlets a fire sprinkler is adapted to be mounted. A cantilever bar having a fractured-like shape, i.e. a bent longitudinal axis of symmetry comprises an upper bar-segment followed by a lower bar-segment the upper bar-segment descends perpendicularly from a zone of the flat base, adjacent the rectangular opening, the farthest from the apex and at midway between the pair of rectangular prolongations. The lower bar-segment follows the upper bar-segment and is directed forwardly and downwardly. A slanted, ribbed plate extends transversely at the bottom end of the cantilever bar being adaptable to tangentially contact the gutter, respectively a curvilinear external surface of the latter. The cantilever bar, except a section of it incorporating the slanted, ribbed plate, has a U-shaped, upwardly directed cross-section, while the section incorporating the slanted, ribbed plate has a downwardly directed, inverted U-shaped cross-section. The U-shaped cross-section, upwardly directed and the inverted U-shaped cross section, downwardly directed, confer together to the cantilever bar a local flexural rigidity.

A tubular housing projecting perpendicularly out of the bottom side of the flat base is firmly, laterally unified with the upper bar-segment. The tubular housing incorporating, starting with its bottom, adjacent the flat base, a first hollow cylindrical body, encircled by a relatively thick wall. A disc-shaped magnet is secured at the bottom of the first hollow cylindrical body and a post provided with a metal end interacts with the disc-shaped magnet, by contacting it; thus, the gutter-anchored structure and the sprinkler attached to it can be lifted and anchored to the gutter.

III. BRIEF DESCRIPTION OF THE DRAWINGS

The subject matter of the invention is particularly pointed out and distinctively claimed in the concluding portion of the specification. The invention, however, both in structure and operation may be better understood by reference to the following description taken in conjunction with the subjoined claims and the accompanying drawings of which FIG. 1 illustrates a top view, in a horizontal plane, of a gutter-anchored structure, according the present invention;

IV. DESCRIPTION OF THE PREFERRED EMBODIMENTS

Figure 1:
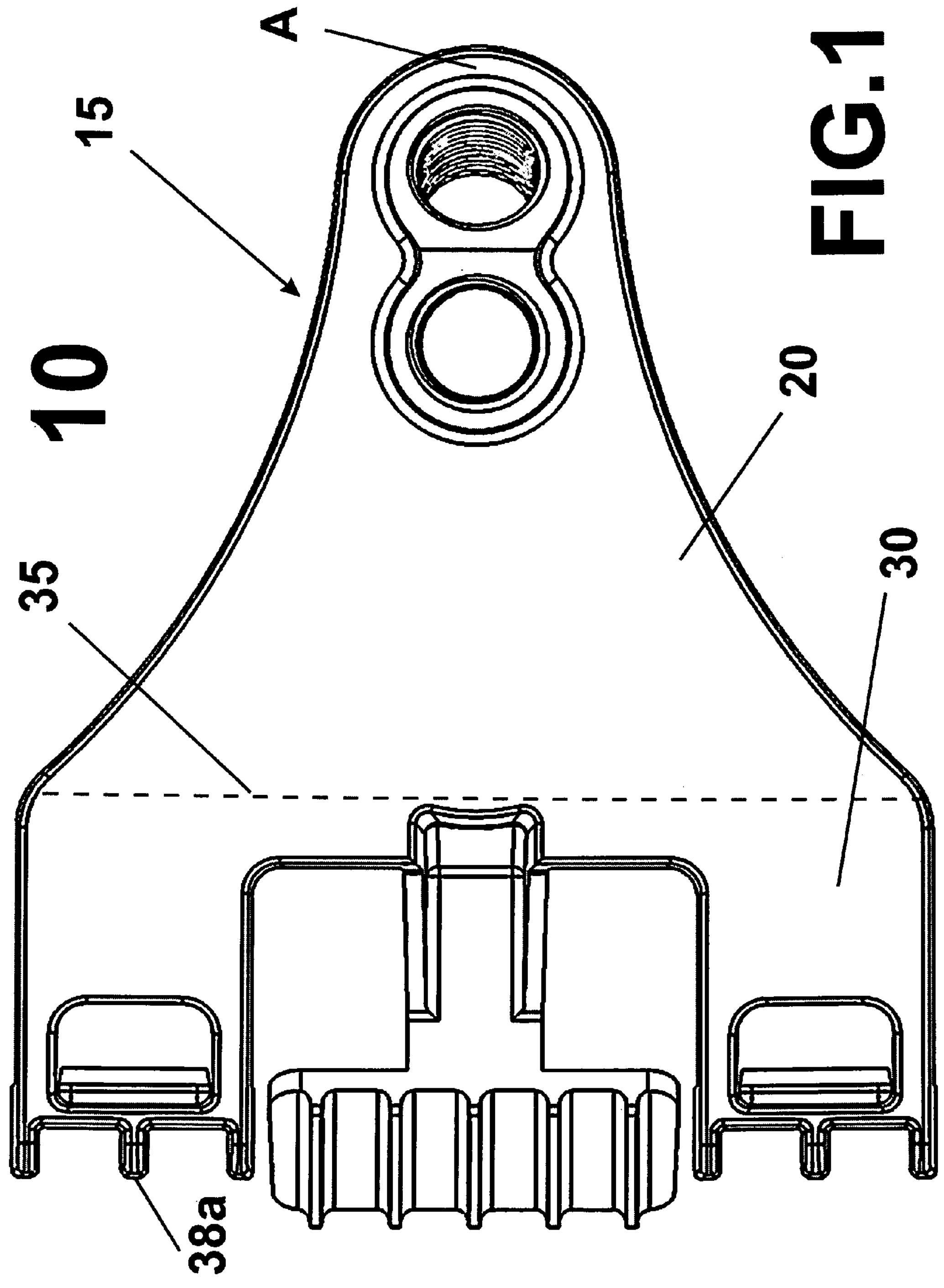
Figure 2:
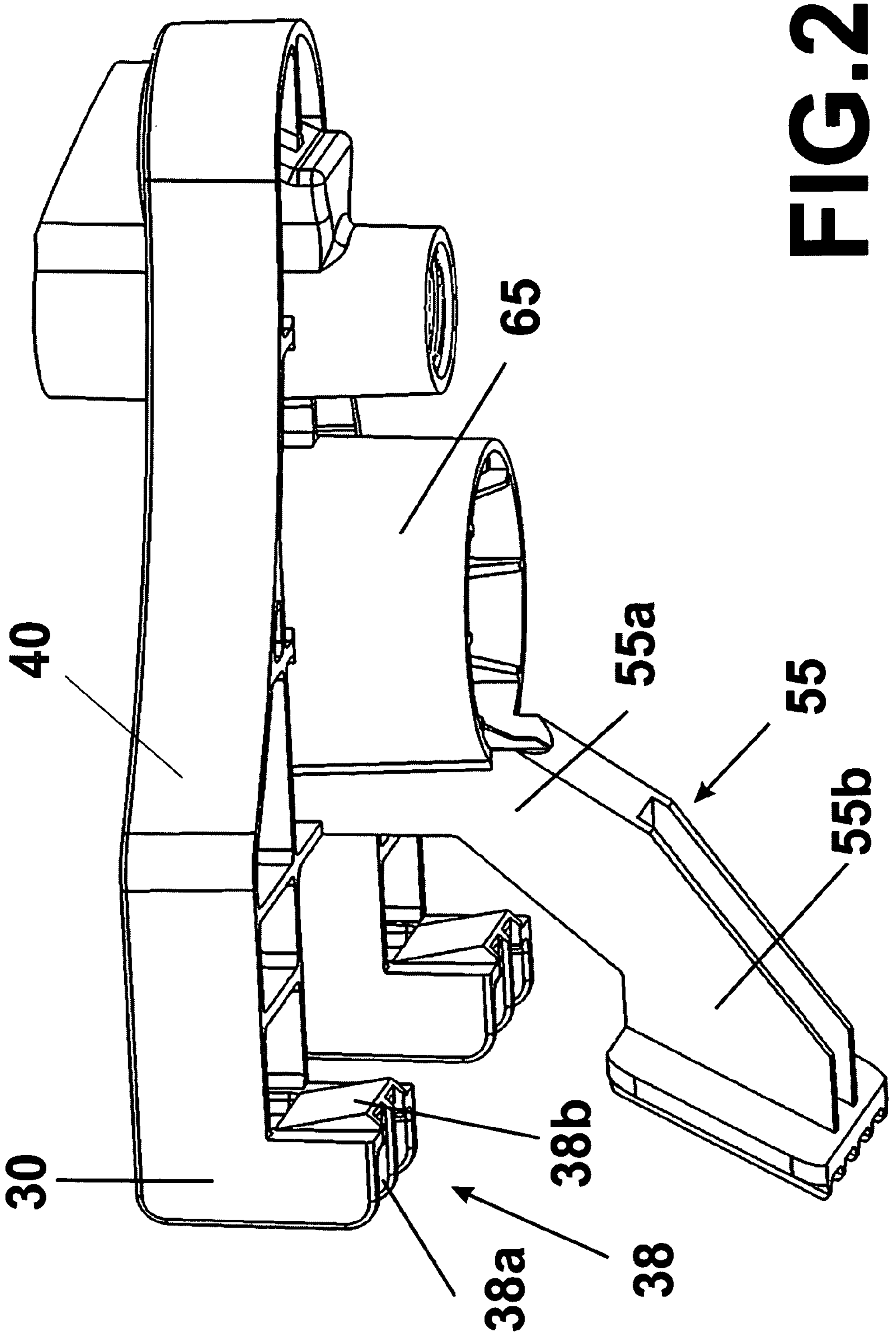
FIG. 2 illustrates a lateral, axonometric perspective projection of the gutter-anchored structure, according the present invention.
Figure 3:
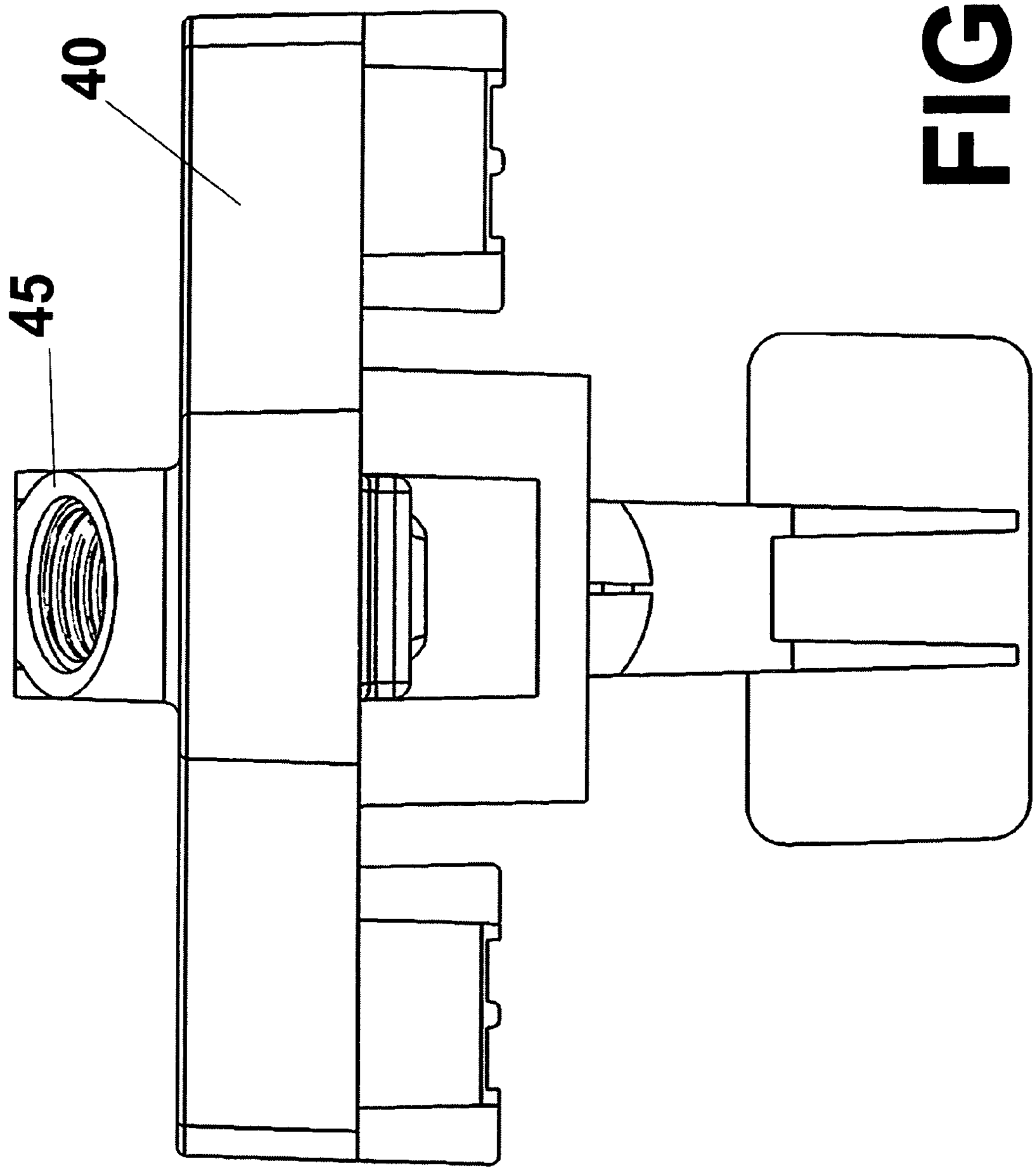
FIG. 3 illustrates a front view of the gutter-anchored structure shown in FIGS. 1-2.
Figure 4:
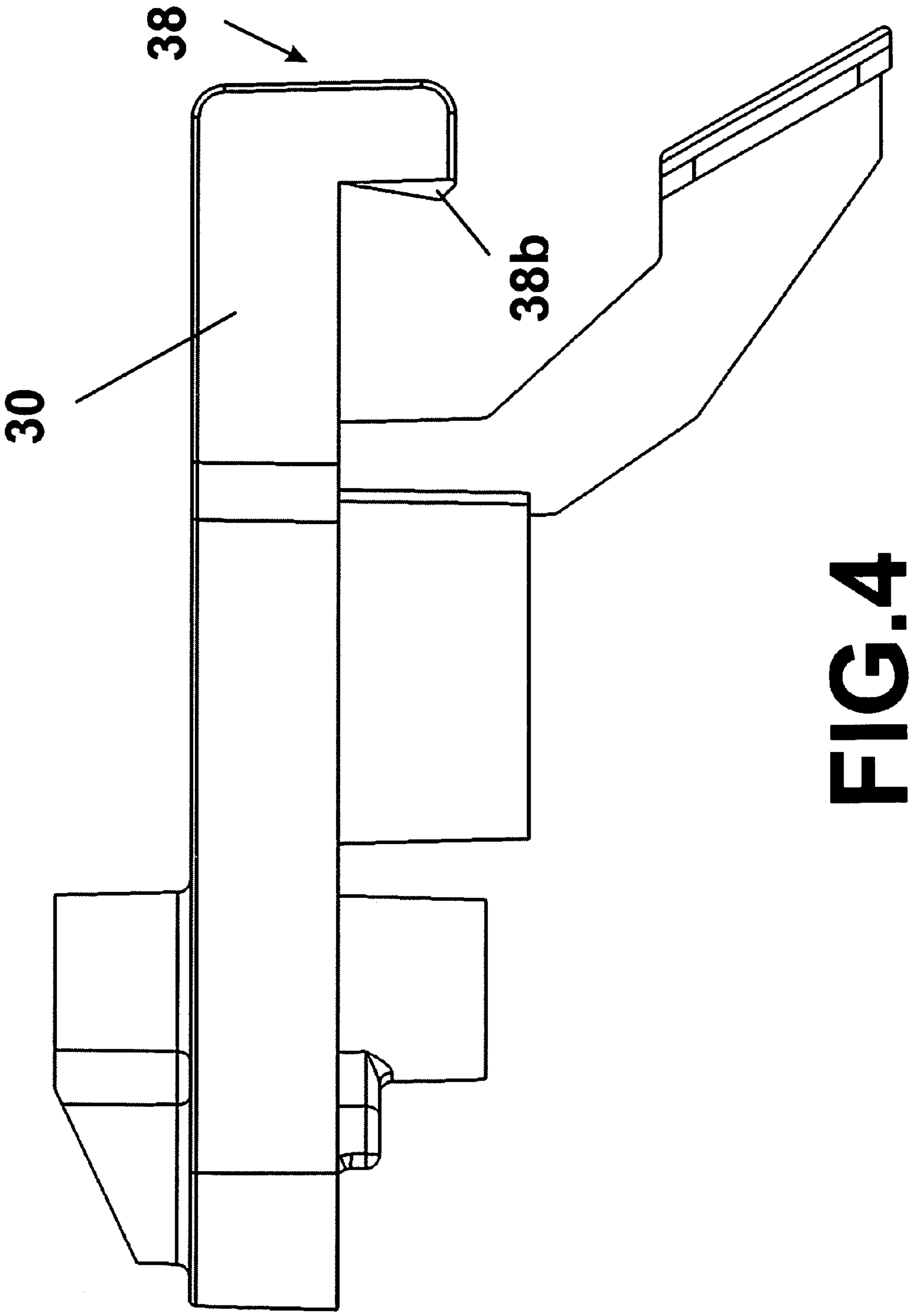
FIG. 4 illustrates a side view of the gutter-anchored structure shown in FIG. 3.
Figure 5:
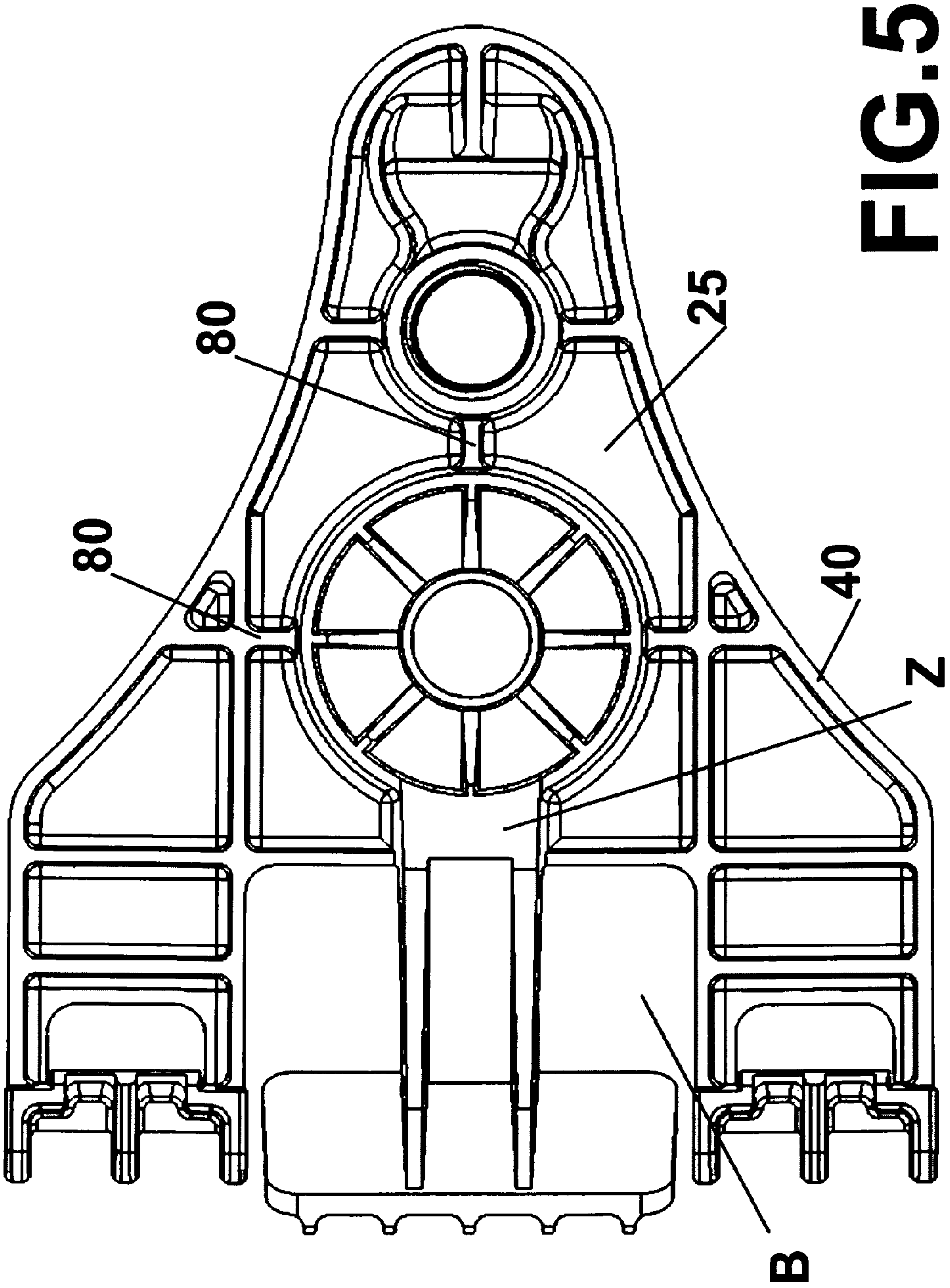
FIG. 5 illustrates a bottom view, in a horizontal plane, of the gutter-anchored structure of FIG. 1.
Figure 6:
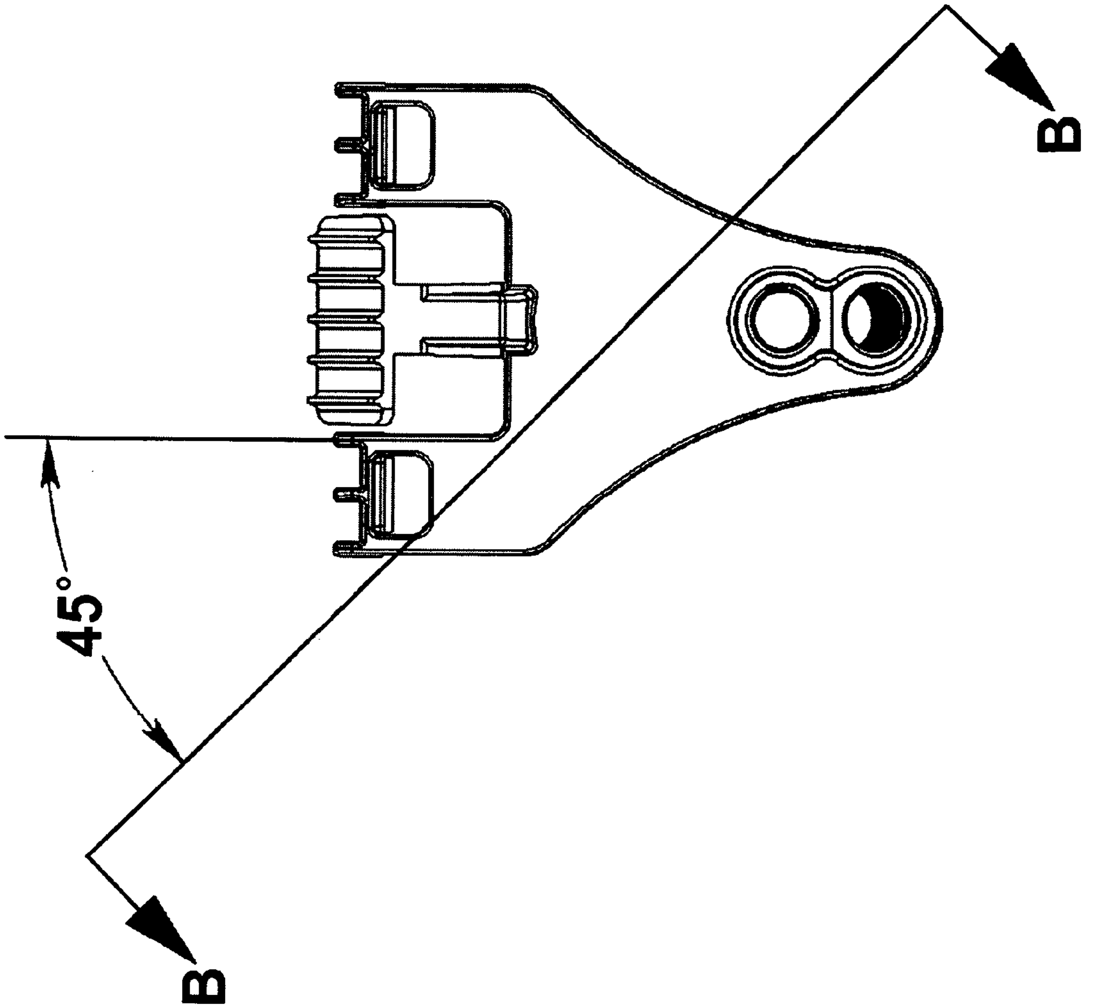
FIG. 6 illustrates the direction of intersection of FIG. 1 along a vertical plan B-B, deviated at 45° with respect to the longitudinal axis of symmetry of FIG. 1.
Figure 7:
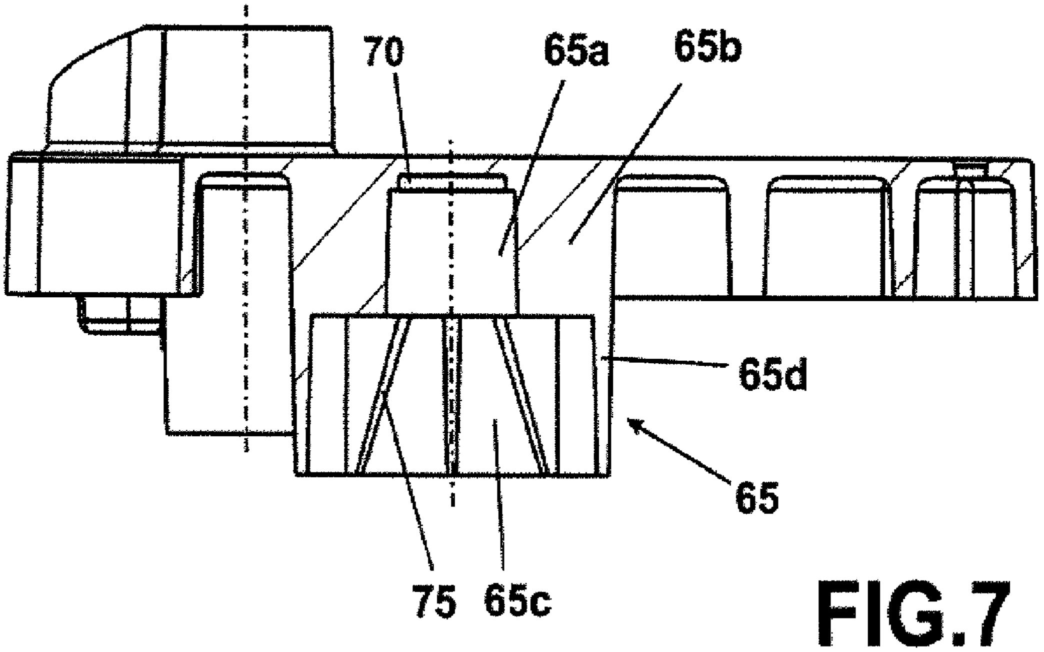
FIG. 7 illustrates the cross-section B-B.
Figure 8:
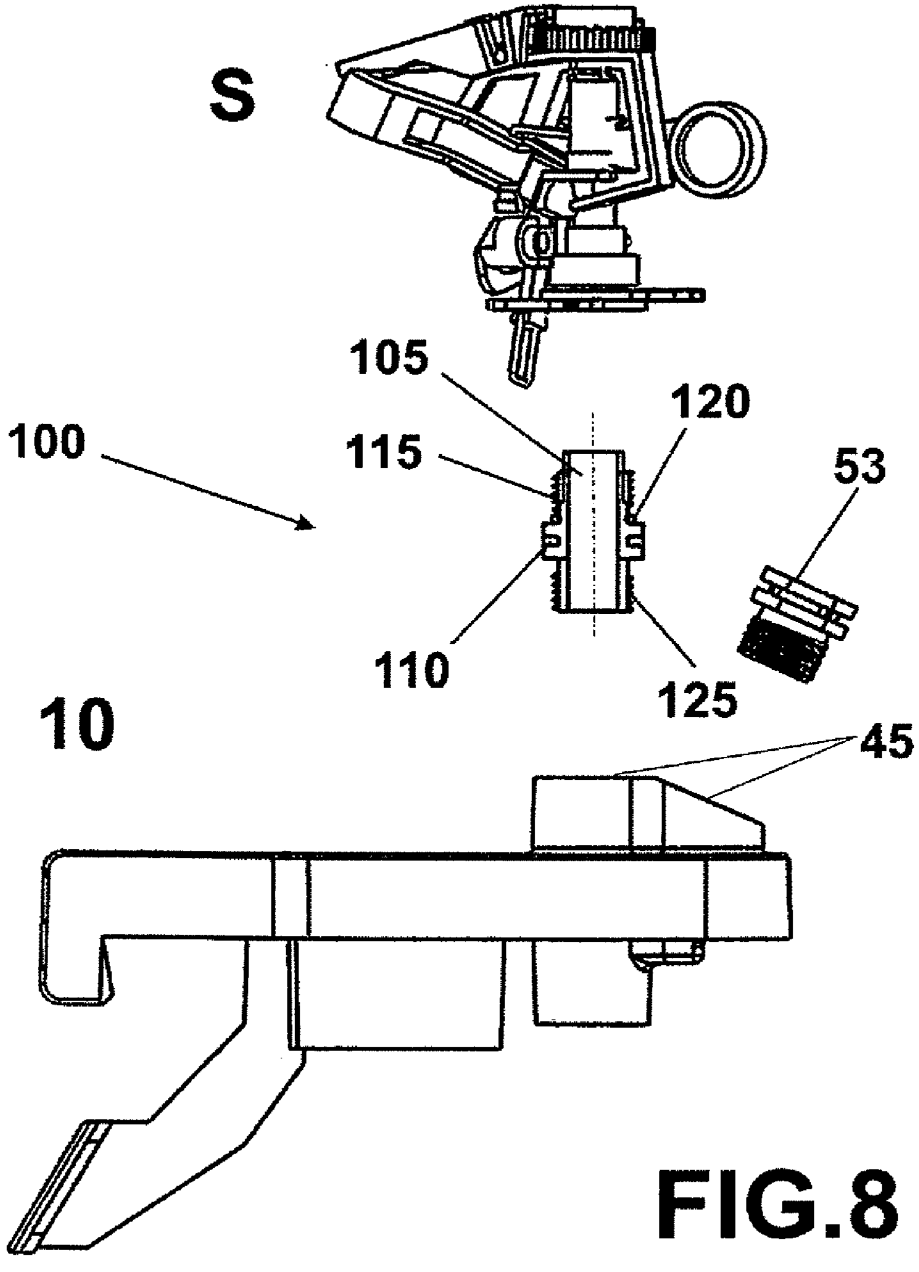
FIG. 8 illustrates an exploded view of a fire sprinkler and a gutter-anchored structure interconnected via a threaded joint, the longitudinal cross section of the latter being shown.
Figure 9:
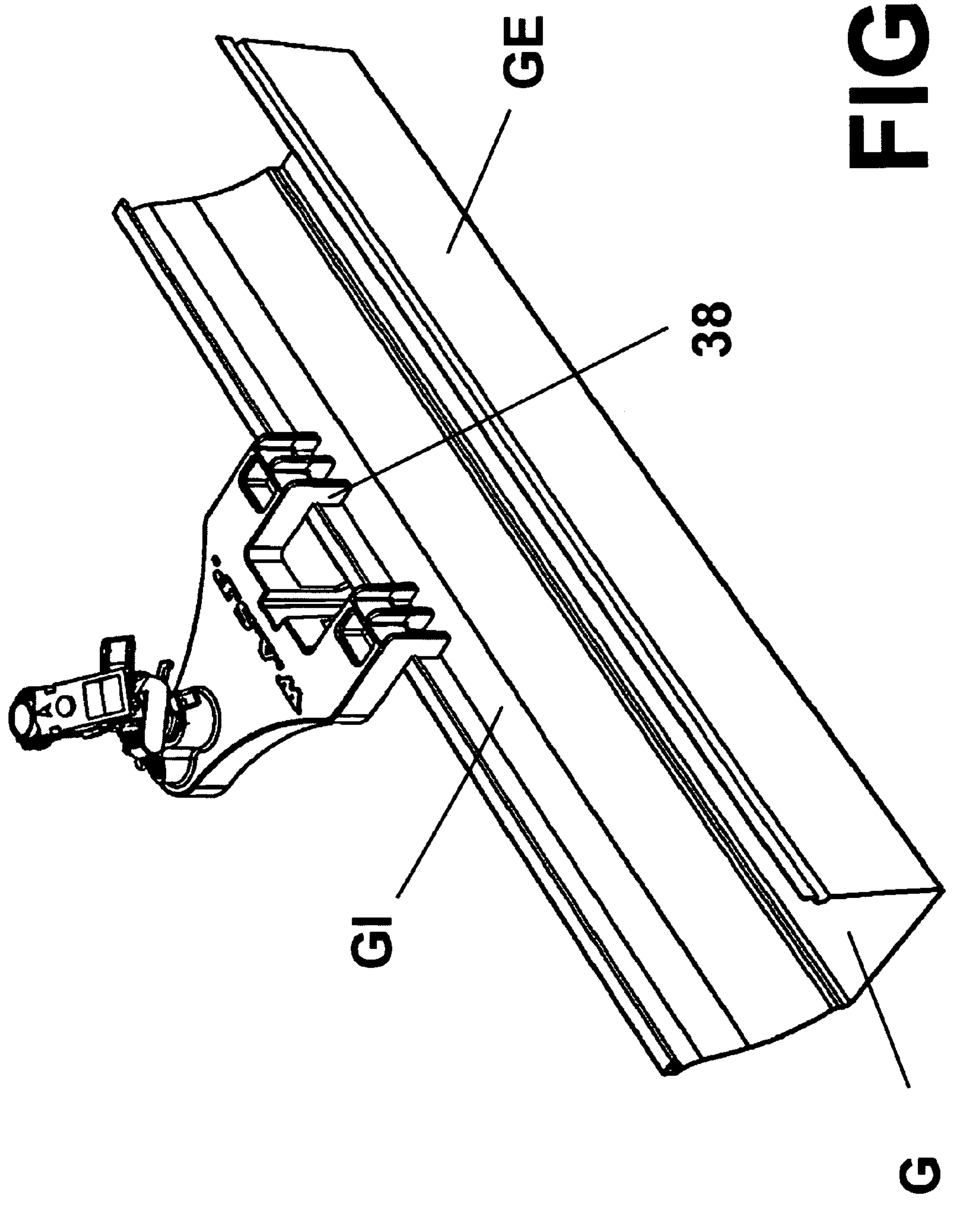
FIG. 9 illustrates a perspective view of the gutter-anchored structure assembled with a sprinkler and clasped together to a gutter, respectively to a curvilinear, internal surface of the latter.
Figure 10:
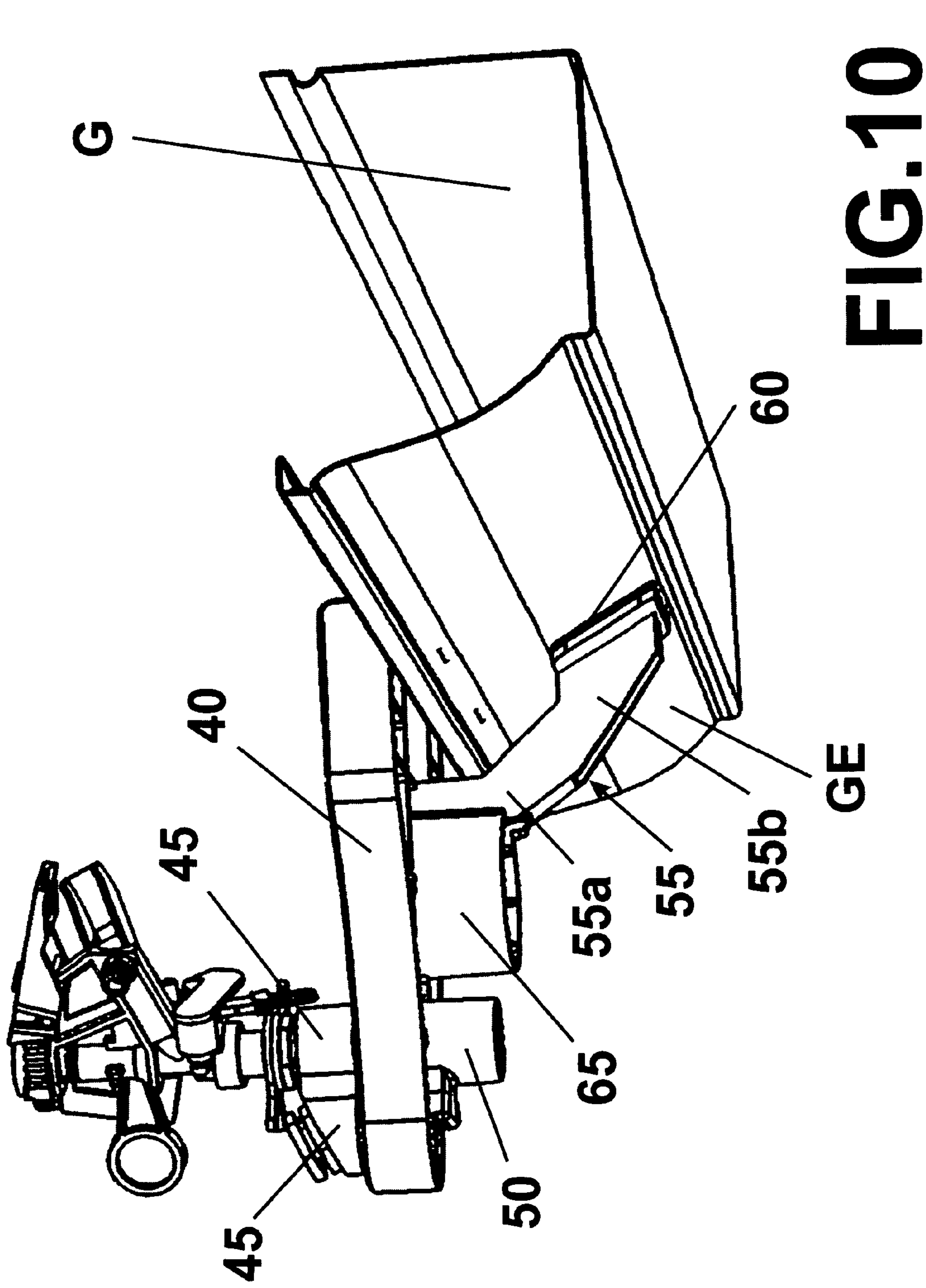
FIG. 10 illustrates a perspective view of the gutter-anchored structure assembled with a sprinkler and clasped together to a gutter, respectively to a curvilinear, external surface of the latter.
Figure 11:
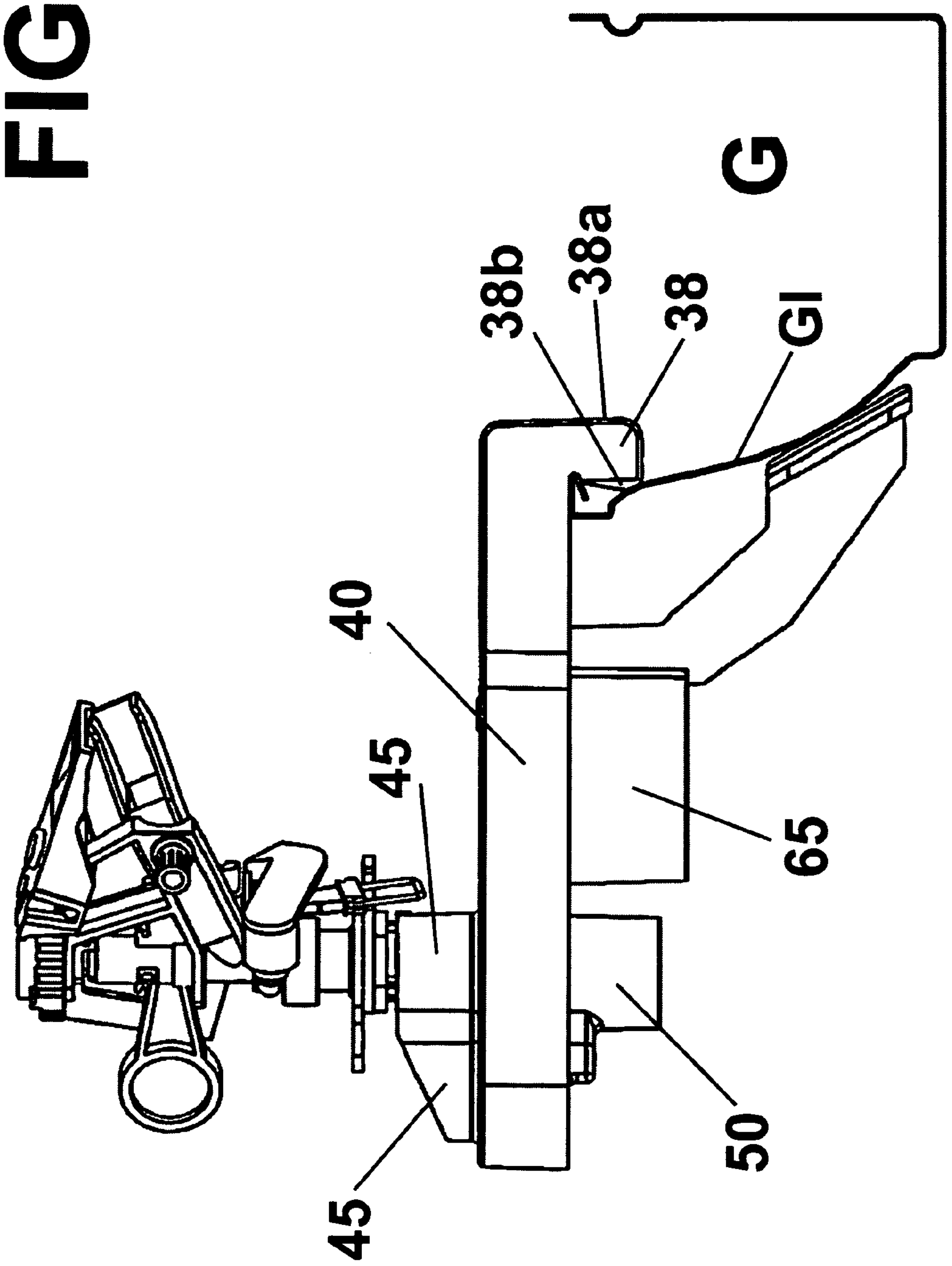
FIG. 11 illustrates a perspective view of the gutter-anchored structure assembled with a sprinkler and clasped together to a gutter, respectively to a curvilinear, internal surface and to a curvilinear, external surface of the latter.

The accompanying drawings, as above described, illustrate a preferred embodiment of “GUTTER-ANCHORED STRUCTURE FOR PORTABLE FIRE SPRINKLERS”. Referring now to FIGS. 1 to 11, in which like numerals indicate like components and features, the “GUTTER-ANCHORED STRUCTURE FOR PORTABLE FIRE SPRINKLERS”, further called “Gutter-anchored structure”, is designated with numeral 10.

Gutter-anchored structure 10 constitutes a monolithic body, all molded from rigid plastic material, incorporating a flat base 15 and provided with a top side 20 and a bottom side 25. Viewed from the top, flat base 15 has, basically, a triangular like shape, with rounded corners. A pair of rectangular prolongations 30 extends from a side 35 of the triangular like shape of flat base 15. Side 35 is located oppositely to the apex A of the triangular like shape of flat base 15. Each rectangular prolongation 30 of the pair of rectangular prolongations 30 is spacedly disposed at one of the opposed extremities of side 35 and terminates into a downwardly extending end 38, bent back at 90 degrees, i.e. perpendicularly directed to flat base 15. Downwardly extending end 38 incorporates a ribbed side 38*a,* outwardly directed and, oppositely, a tapered plate 38*b*, inwardly directed. Tapered plate 38*b* is adapted to tangentially contact and secure to a gutter G, respectively to a curvilinear, internal surface GI of the latter.

A rectangular opening B is formed between the pair of rectangular prolongations 30.

A rim 40 perpendicular to bottom side 25 of flat base 15 extends below the latter, along its perimeter.

A pair of hollow, cylindrical outlets 45, closely spaced and forming an unitary body, is located adjacent apex A and is partially embedded into flat base 15.

One of the pair of hollow, cylindrical outlets 45, contiguous to apex A, has its longitudinal axis of symmetry (not shown) angled with respect to top side 20 of flat base 15, while the other one of the same pair of hollow, cylindrical outlets 45 has its longitudinal axis of symmetry (also not shown) perpendicularly directed to top side 20 of flat base 15.

The aforementioned longitudinal axes of symmetry concur and at some point intersect, so that the pair of hollow, cylindrical outlets 45 changes into a common, hollow cylindrical inlet 50; the latter projects outwardly from bottom side 25 of flat base 15 and is provided with a female threaded surface and adapted to interconnect with a threaded hose connector (not shown). Thus, one flow of water entering and passing through single, hollow cylindrical inlet 50, is divided into two distinct flows of water in the pair of hollow cylindrical outlets 45.

The pair of hollow cylindrical outlets 45 are both provided with an internal thread; alternatively, only in one of the pair of hollow cylindrical outlets 45 a fire sprinkler S could be mounted. For example, when a fire sprinkler S is used for a pitched roof, it will be mounted in that hollow cylindrical outlet 45 defined by the angled longitudinal axis of symmetry; during this time, the other hollow cylindrical outlet will be closed by a cap 53. Conversely, for a flat roof, the foregoing situation will be interchanged.

A cantilever bar 55 having a fractured-like shape, i.e. a bent longitudinal axis of symmetry (not shown), comprises an upper bar-segment 55*a* followed by a lower bar-segment 55*b*. Upper bar-segment 55*a* descends perpendicularly from a zone Z of flat base 15, adjacent rectangular opening B, the farthest from apex A, and at midway between the pair of rectangular prolongations 30. Lower bar-segment 55*b* follows upper bar-segment 55*a* and is directed forwardly and downwardly.

A slanted, ribbed plate 60 extends transversely at the bottom end of cantilever bar 55. Slanted, ribbed plate 60 is adapted to tangentially contact gutter G, respectively a curvilinear external surface GE of the latter.

Cantilever bar 55, except a section of it which incorporates slanted, ribbed plate 60, has a U-shaped cross-section, upwardly directed, while another section of cantilever bar 55, adjacent ribbed plate 60 has a downwardly directed, inverted U-shaped cross-section. U-shaped cross-section, upwardly directed and inverted U-shaped cross section, downwardly directed, confer together to cantilever bar 55 a local flexural rigidity.

A tubular housing 65 projecting perpendicularly out of bottom side 25 of flat base 15 is firmly, laterally unified with upper bar-segment 55*a*. Tubular housing 65 incorporates, starting with its bottom, adjacent flat base 15, a first hollow cylindrical body 65*a*, encircled by a relatively thick wall 65*b*. A disc-shaped metal piece 70 is secured at the bottom of first hollow cylindrical body. A post (not shown) ending with a magnetic metal end (also not shown) is used to contact disc-shaped metal piece 70 and, thus, joining it. In this manner, gutter-anchored structure 10 and sprinkler S attached to it can be lifted and anchored to gutter G.

First hollow cylindrical body 65*a,* encircled by relatively thick wall 65*b,* extends outwardly into a second hollow cylindrical body 65*c,* encircled by a relatively thin wall 65*d.* First hollow cylindrical body 65*a* and second hollow cylindrical body 65*c* have a common generatrix. A series of triangular ribs 75 extending radially from an internal surface of second hollow cylindrical body 65*c,* connects the latter with first hollow cylindrical body 65*a,* respectively bottom surface of thick wall 65*b.*

In order to confer flexural spatial rigidity to gutter-anchored structure 10, a space under flat base 15, circumscribed by rim 40, is provided with radial connecting ribs 80 of substantially uniform thickness, all projecting from bottom side 25 of flat base 15. Hollow cylindrical inlet 50 and tubular housing 65, in order to prevent deformations, followed by fissuring, are reinforced for reliability by radial connecting ribs 80.

A threaded joint 100, of conventional type, is traversed by a through channel 105 and includes a central hexagonal area 110. Central hexagonal area 110 is continued towards the top by a first threaded shank 115 provided with an O-ring 120. After central hexagonal area 110 towards the bottom, a second threaded shank 125 follows. First threaded shank 115 is intended to be assembled with a conventional sprinkler S. Second threaded shank 125 is threadlike with each one of the hollow cylindrical outlets of the pair of hollow cylindrical outlets 45, respectively with its internal thread. A cap 50 is used to close one of the pair of hollow cylindrical outlets 45, wherein in the other one of the pair of hollow cylindrical outlets 45—a sprinkler S is mounted.

What I claim is:

1. A gutter-anchored structure for portable fire sprinklers.

2. A gutter-anchored structure for portable fire sprinklers comprising a molded monolithic body, incorporating a flat base and provided with a top side and a bottom side; viewed from the top, said flat base having a triangular shape with rounded corners; a pair of rectangular prolongations extending from a side of said flat base, said side being located oppositely to an apex of said flat base, each rectangular prolongation of said pair of rectangular prolongations being spacedly disposed at one of the opposed extremities of said side and terminating into a downwardly extending end, bent back at 90 degrees, thus perpendicularly directed to said flat base; said downwardly extending end incorporating a ribbed side, outwardly directed, and, oppositely, a tapered plate inwardly directed, said tapered plate being adapted to tangentially contact and secure to a gutter, respectively to a curvilinear, internal surface of said gutter; a rectangular opening formed between said pair of rectangular prolongations; a rim perpendicular to said bottom side of said flat base extending below the latter, along a perimeter of said bottom side; a pair of hollow, cylindrical outlets, closely spaced and forming an unitary body, located adjacent said apex and partially embedded into said flat base; one of said pair of hollow, cylindrical outlets, contiguous to said apex, having a longitudinal axis of symmetry angled with respect to said top side of said flat base, while the other one of said pair of hollow, cylindrical outlets having a longitudinal axis of symmetry perpendicularly directed to said top side of said flat base; said aforementioned longitudinal axes of symmetry concur and at some point intersect, so that said pair of hollow, cylindrical outlets changes into a common, hollow cylindrical inlet projecting outwardly from said bottom side of said flat base and provided with a female threaded surface and adapted to interconnect with a threaded end of a hose; said pair of hollow cylindrical outlets being both provided with an internal thread; alternatively, only in one of said pair of hollow cylindrical outlets a fire sprinkler being adapted to be mounted; a cantilever bar having a fractured shape, defined by a bent longitudinal axis of symmetry comprising an upper bar-segment followed by a lower bar-segment; said upper bar-segment descending perpendicularly from a zone of said flat base, adjacent said rectangular opening, the farthest from said apex and at midway between said pair of rectangular prolongations; said lower bar-segment following said upper bar- segment being directed forwardly and downwardly; a slanted, ribbed plate extending transversely at the bottom end of said cantilever bar, said slanted, ribbed plate being adaptable to tangentially contact said gutter, respectively a curvilinear external surface of the latter; said cantilever bar, except one section incorporating said slanted, ribbed plate, having a U-shaped, upwardly directed cross-section, while said section incorporating said slanted, ribbed plate having a downwardly directed, inverted U-shaped cross-section; said U-shaped cross-section, upwardly directed and said inverted U-shaped cross section, downwardly directed, conferring together to said cantilever bar a local flexural rigidity; a tubular housing projecting perpendicularly out of said bottom side of said flat base being firmly, laterally unified with said upper bar-segment; said tubular housing incorporating, starting with a bottom of said tubular housing bottom, adjacent said flat base, a first hollow cylindrical body, encircled by a relatively thick wall; a disc-shaped magnet being secured at the bottom of said first hollow cylindrical body; and a post provided with a metal end interacting by contact with said disc-shaped magnet; thus, said gutter-anchored structure and said attached sprinkler can be lifted and anchored to said gutter.

* * * * *